Dec. 7, 1926. 1,610,063
L. LYNDON
CONTAINING CELL FOR ELECTRIC BATTERIES
Original Filed Dec. 23, 1919
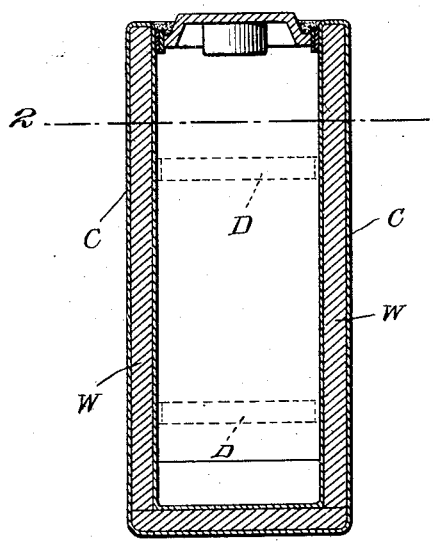
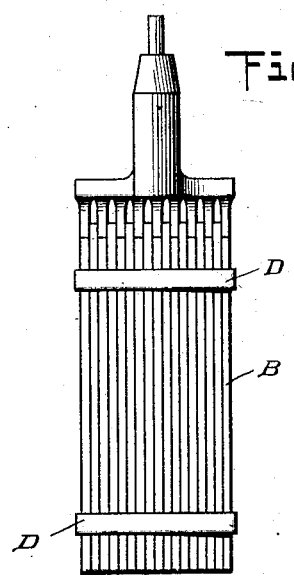
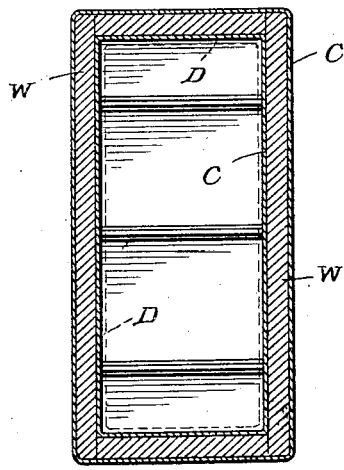
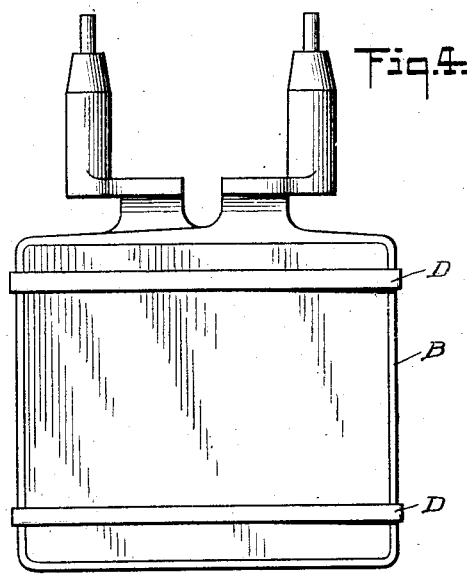
INVENTOR
*Lamar Lyndon*
BY
ATTORNEY Patented Dec. 7, 1926.

1,610,063

UNITED STATES PATENT OFFICE.

LAMAR LYNDON, OF NEW YORK, N. Y.

CONTAINING CELL FOR ELECTRIC BATTERIES.

Original application filed December 23, 1919, Serial No. 347,011, now Patent No. 1,501,352, dated July 15, 1924. Divided and this application filed November 13, 1923. Serial No. 674,475.

My invention relates to containing jars or cells for electric batteries and, more particularly, for the lead oxide type of such batteries.

One of the objects of my invention is to obviate some of the difficulties which exist in the prevailing types of storage battery cells of the smaller sizes. A more specific object is the production of storage batteries for starting and lighting purposes on motor cars which will be durable, not subject to cracking, and of comparatively low cost, although my invention is equally applicable to other types of batteries. Other objects of my invention will become apparent from the detailed description which follows.

In the practice of my invention, I construct the battery container of wood, steel or other suitable material, and coat this non-acid resisting material with a substance which is acid-resisting, thus providing my battery container with the requisite strength and, at the same time, the necessary water-tight and acid-resisting properties. I am aware that coating of a non-acid resisting material with an acid-resisting substance is not new. But, in commercial practice, such coating is very thin and if the battery elements inside the container are subject to shaking, pounding or moving about, the thin protective covering will be abraded or broken through by the metallic edges of the elements, and whenever such a break or abrasion occurs the non-acid resisting substance will be exposed to the action of the electrolyte, leading to the ultimate destruction of the container. In order to protect the thin acid-resising coating against injury, I provide protecting ribs or strips placed between the elements and the inner walls of the container, these protecting strips or ribs being made of resilient, acid-resisting material. In an application, filed Dec. 23, 1919, Serial No. 347,011, of which this is a division, which has matured into Patent 1,501,352, July 15, 1924, I have restricted my invention to one form, namely, the case where the protecting strip or ribs are either formed by a thickening of the protecting coating itself, or, in general, made a part of the container walls. In the present form of my invention, the protecting strips or bands are either positioned between the container walls and the elements and held in this position by friction or otherwise, or made a part of the elements, i. e. fastened to the elements in some suitable manner.

While I do not restrict my invention to any particular construction, when the battery has a plurality of cells, the preferable construction is to make the container of sufficient dimensions to contain all the elements, and place partitions in the container in such number as to form the requisite amount of cells. The entire structure thus formed is then coated with an impervious, acid-resisting substance, by spraying, dipping, or in any suitable manner. This acid-resisting substance is, preferably, a material substantially comprising cellulose treated with a suitable acid which produces a chemical compound soluble in certain solvents and, when so dissolved and the solvent is subsequently removed, leaves a substance having the general characteristics of a pyroxylin plastic.

In the drawings, one method of applying my invention is illustrated. They show the arrangement adapted for the usual standard lighting and starting battery for gasoline motor cars, but the illustration is equally well applicable to single individual cells and to a plurality of cells connected either in series or in parallel. The present practice for gasoline motor cars is to make batteries of three cells in series, giving approximately six volts.

Figure 1 shows a vertical transverse section through a battery jar. Figure 2 is a horizontal section along the line 2—2. Figure 3 is a front elevation, and Figure 4 a side elevation, of a set of battery elements. In these figures, B are the battery elements, W is the core or material of which the cell is made, C is the thin protecting coating, and D the protecting strips or bands which surround the battery elements and are interposed between them and the inner walls of the jar. As these protecting strips or bands D do not constitute an integral part of the jar but are independent thereof, they are indicated in Figures 1 and 2 by dotted lines.

I claim:

1. A battery comprising a container made of non-acid resisting material and covered with a film of an impervious acid-resisting substance, battery elements, and strips of acid-resisting material on said battery elements adapted to protect said film from contact with said elements.

2. A battery comprising a container made of nonacid-resisting material coated with a film of a pyroxylin plastic, battery elements, and strips of acid-resisting material on said elements adapted to protect said film from contact with said elements.

3. A battery comprising a container made of non acid-resisting material and covered with a film of an impervious acid-resisting substance, battery elements, and resilient strips of acid-resisting material on and surrounding said battery elements to protect said film.

LAMAR LYNDON.